US008575812B2

(12) United States Patent
Westermark et al.

(10) Patent No.: US 8,575,812 B2
(45) Date of Patent: Nov. 5, 2013

(54) ELECTRIC MOTOR

(75) Inventors: Magnus Westermark, Ekero (SE);
Mikael Hertzman, Sollentuna (SE)

(73) Assignee: Trimble AB, Danderyd (SE)

( * ) Notice: Subject to any disclaimer, the term of this patent is extended or adjusted under 35 U.S.C. 154(b) by 627 days.

(21) Appl. No.: 11/631,508

(22) PCT Filed: Jul. 7, 2005

(86) PCT No.: PCT/EP2005/007348
§ 371 (c)(1),
(2), (4) Date: Oct. 7, 2008

(87) PCT Pub. No.: WO2006/005511
PCT Pub. Date: Jan. 19, 2006

(65) Prior Publication Data
US 2009/0039726 A1    Feb. 12, 2009

(30) Foreign Application Priority Data
Jul. 9, 2004    (SE) ........................................ 0401826

(51) Int. Cl.
*H02K 3/04*    (2006.01)
*H02K 17/12*    (2006.01)
*H02K 19/10*    (2006.01)

(52) U.S. Cl.
USPC ........... 310/207; 310/208; 310/203; 310/204; 310/205; 29/605; 29/606

(58) Field of Classification Search
USPC ......... 29/596, 592.1; 310/207, 208, 268, 267, 310/203–206
See application file for complete search history.

(56) References Cited

U.S. PATENT DOCUMENTS

| 4,307,311 | A | * | 12/1981 | Grozinger | ...................... 310/179 |
| 5,197,180 | A | * | 3/1993 | Mihalko | .......................... 29/596 |
| 5,475,930 | A | | 12/1995 | Kimura | |
| 5,970,787 | A | * | 10/1999 | Wignall | ..................... 73/152.54 |

(Continued)

FOREIGN PATENT DOCUMENTS

| DE | 1 613 391 | 10/1970 |
| DE | 31 19 325 A1 | 12/1982 |

(Continued)

OTHER PUBLICATIONS

Machine translation of JP2002291187, Toyoshima et al., Apr. 10, 2002.*

(Continued)

*Primary Examiner* — Terrance Kenerly
(74) *Attorney, Agent, or Firm* — Harness, Dickey & Pierce, P.L.C.

(57) ABSTRACT

A winding for an n-phase electric motor is disclosed. The inventive winding comprises a number of consecutive winding groups of n individual windings, wherein at any point in time an individual winding of a first group exhibits one direction of current flow and wherein at the same point in time a corresponding individual winding of an adjacent group exhibits the opposite direction of current flow. There is also disclosed a method for preparing such winding. It is further disclosed a magnetic unit adapted for such winding, comprising permanent magnets being essentially triangular in cross-section. Further, there is disclosed electric motors using the inventive winding concept, as well as geodetic instruments taking advantage thereof. An electric motor according to the disclosed inventive concept is particularly well suited for direct drive.

15 Claims, 8 Drawing Sheets

(56) References Cited

U.S. PATENT DOCUMENTS

| | | | |
|---|---|---|---|
| 5,987,763 A | 11/1999 | Ammann et al. | |
| 6,208,055 B1 | 3/2001 | Takahashi | |
| 6,498,413 B2 * | 12/2002 | Imori et al. | 310/180 |
| 6,983,528 B1 * | 1/2006 | Muller et al. | 29/596 |
| 2002/0036439 A1 | 3/2002 | Ooiwa | |
| 2004/0040142 A1 * | 3/2004 | Hirota et al. | 29/596 |
| 2004/0046475 A1 * | 3/2004 | Holzheu et al. | 310/201 |
| 2004/0083597 A1 * | 5/2004 | Ooiwa | 29/596 |
| 2004/0117975 A1 * | 6/2004 | Nakamura | 29/596 |
| 2004/0251748 A1 * | 12/2004 | Inagaki et al. | 310/14 |
| 2006/0005376 A1 * | 1/2006 | Hirota et al. | 29/605 |
| 2009/0121576 A1 * | 5/2009 | Even et al. | 310/208 |

FOREIGN PATENT DOCUMENTS

| | | |
|---|---|---|
| DE | 40 21 256 A1 | 1/1992 |
| DE | 202004002372 | 8/2005 |
| EP | 1 102 385 A2 | 5/2001 |
| EP | 1 120 881 A2 | 8/2001 |
| EP | 1 503 485 A1 | 2/2005 |
| GB | 2 240 666 A | 8/1991 |
| JP | 57135645 A | 8/1982 |
| JP | 62007352 | 1/1987 |
| JP | 2000-175391 | 6/2000 |
| JP | 2002/25832 A | 1/2002 |
| JP | 2002291187 * | 4/2002 |
| JP | 2002-291187 | 10/2002 |
| JP | 2003-070197 | 3/2003 |
| WO | WO-9903188 A1 | 1/1999 |
| WO | WO 01/54254 A1 | 7/2001 |
| WO | WO2004017681 * | 2/2004 |

OTHER PUBLICATIONS

Machine translation of WO2004017681, Keishima et al., Feb. 2004.*
Form PCT/IB/326.
English Translation of Japanese Office Action No. 2007-519726 dated Jan. 21, 2011.
Japanese Office Action dated Apr. 6, 2012 for Japanese Application No. 2007-519726 (full english translation provided).

* cited by examiner

ELECTRIC MOTOR

FIELD OF THE INVENTION

The present invention generally relates to electric motors. More particularly, the inventive concept disclosed and claimed herein relates to a method for providing a winding for an electric motor, a winding thus prepared and a magnetic unit adapted to be used with such a winding. The inventive concept also relates to a total station taking advantage of the electric motor.

BACKGROUND OF THE INVENTION

In surveying instruments, especially in so called total stations, it is required to position a movable unit in the instrument around a horizontal axis and a vertical axis by rotating the movable unit around the axis required. The rotation of the movable unit around either axis is normally effected via a gear arrangement either by hand for a manual instrument, or by means of an electric motor connected to the gear arrangement for an automated instrument that is intended to automatically move from one position to another in a procedure of tracking, i.e. in which a total station locks on and follows a target or finds a specific target in a known position. Such gear arrangements need to be of very high precision in order to serve their purpose, and are as a consequence quite expensive. In such a gear arrangement there is generally a mechanical backlash and a hysteresis effect, leading to a need for angle sensors both on the motor and on the movable unit in order to obtain a sufficiently stable and exact servo loop for controlling the motor.

The presence of a gear arrangement with high gear ratio in an apparatus that should allow forced movement by hand of the movable unit, typically requires a friction clutch between the motor and the movable unit, allowing the movable unit to move while the gear arrangement remains in position.

Motor drive systems of the above type are expensive due to the complexity of details, with high demands on tolerances for the gear wheels. Gear wheels automatically imply wear and tear, lubrication requirements, service intervals etc.

Motor drive systems used for these purposes in the prior art have exhibited high gear ratio (typically 600 times in a total station) and this inherently means that there will be some play present. The common motor drive used in the prior art requires two rotation sensors, one on the motor axis giving a fast but not so accurate angle measurement, and one on the outgoing axis giving precision adjustment information.

Examples of motor drive systems for surveying instruments may be found in U.S. Pat. No. 5,987,763 and U.S. Pat. No. 5,475,930. A brushless DC permanent magnet motor is known from WO99/03188 (PCT/US98/14010) and a method for making a motor winding from U.S. Pat. No. 5,197,180. The disadvantage of using a gear has already been discussed above. The winding method described in U.S. Pat. No. 5,197,180 comprises the step of reversing the winding direction for each group of windings, which may cause complications in the winding.

SUMMARY OF THE INVENTION

Therefore, it is here disclosed an electric motor for which the need for gear wheels is eliminated, by providing a direct drive system. It is also disclosed a new type of winding for an electric motor, as well as a corresponding magnetic system.

For the inventive motor system disclosed herein, power efficiency and available torque can be largely improved compared to prior art systems. In general terms, this is facilitated by having a winding that allows the electric current to be practically perpendicular to the magnetic field throughout its effective length. Moreover, the magnetic system is designed to provide a more uniform field, which further improves the efficiency and the torque of the motor, particularly in combination with the inventive winding.

The invention relates to a method for preparing a winding, the winding obtained thereby, and a motor having a magnetic unit adapted to be used with such a winding. The invention is directed at solving problems described above.

It is therefore an object of the present invention to provide a motor, which is fit for the purposes described in the preamble of the description, i.e. which provides for a more exact control of the movable unit and which is particularly adapted for direct drive.

One advantage obtained by embodiments of the present invention is thus that the use of a friction clutch is rendered unnecessary.

Another advantage obtained by embodiments of the inventive motor concept is that the requirements on the mechanical parts are not so demanding and that the motor is easy to assemble.

Another advantage that may be obtained by embodiments of the present invention is that a motor drive system of low weight can be provided.

Yet another advantage is that a design of the permanent magnets may be provided which will give the magnetic field in the motor as homogeneous a flow as possible.

The present invention therefore provides a direct drive motor for improved performance, which is fast and accurate, and does not provide any backlash.

It also provides a drive system which exhibits a low noise level.

The present invention further provides a motor with low power consumption. This is accomplished i.a. by the magnetic field being optimized and also by the absence of any gear means.

The present invention is preferably realized in a method of making a winding and a magnetic unit for a motor and a motor, in which this winding and the magnetic unit may be used.

BRIEF DESCRIPTION OF THE DRAWINGS

In order to explain the objects, advantages and features of the present invention, reference is made below to the figures of the drawings, wherein.

DETAILED DESCRIPTION

Figure 1:
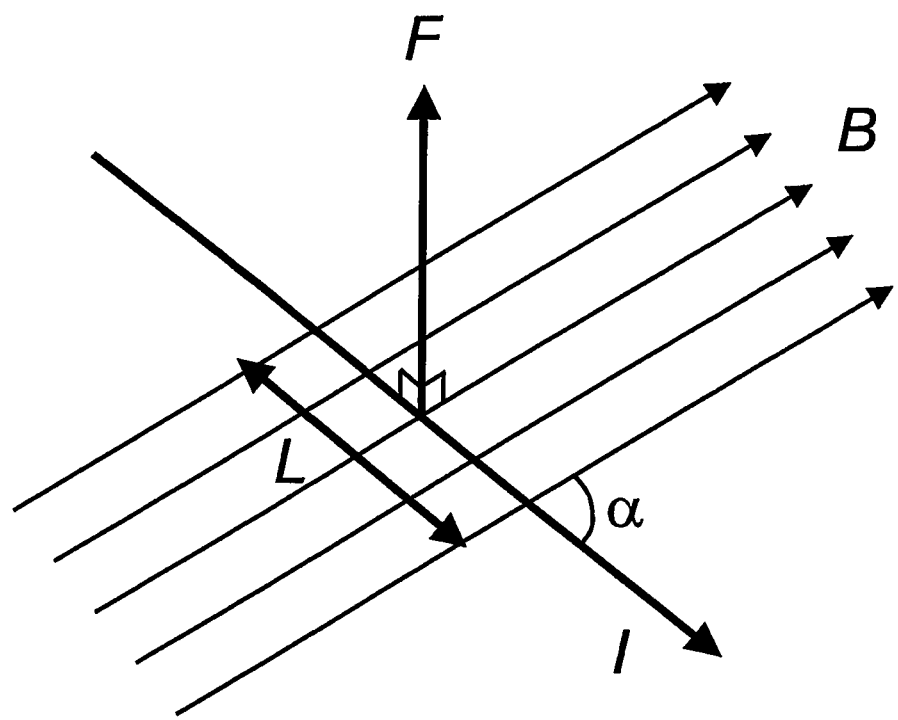
FIG. 1 is an illustration of the correlation between current, magnetic field, and force.

The force excerted on a conducting wire in a magnetic field may be expressed as $F=B*I*L*\sin(\alpha)$, where B is the magnetic flux density (Tesla), I is the current (A) flowing in the conductor, $\alpha$ is the angle between the current and the magnetic field, L is the length of the wire (m), and F is the force vector (N), perpendicular to the plane defined by B and I. This is illustrated in FIG. 1. It is clear from this expression that in order to maximize the excerted force, the current should be perpendicular to the magnetic flux. At right angles between the current and the magnetic flux, $\sin(\alpha)$ is equal to unity and the force is maximized. If the current and the magnetic flux were parallel, $\sin(\alpha)$ would reduce to zero and no force would be excerted. Normally, however, it is very difficult to provide a winding for an electric motor such that the current becomes perpendicular to the magnetic flux. In the prior art, the available driving force has thus always been substantially below the theoretical limit.

Figure 2:
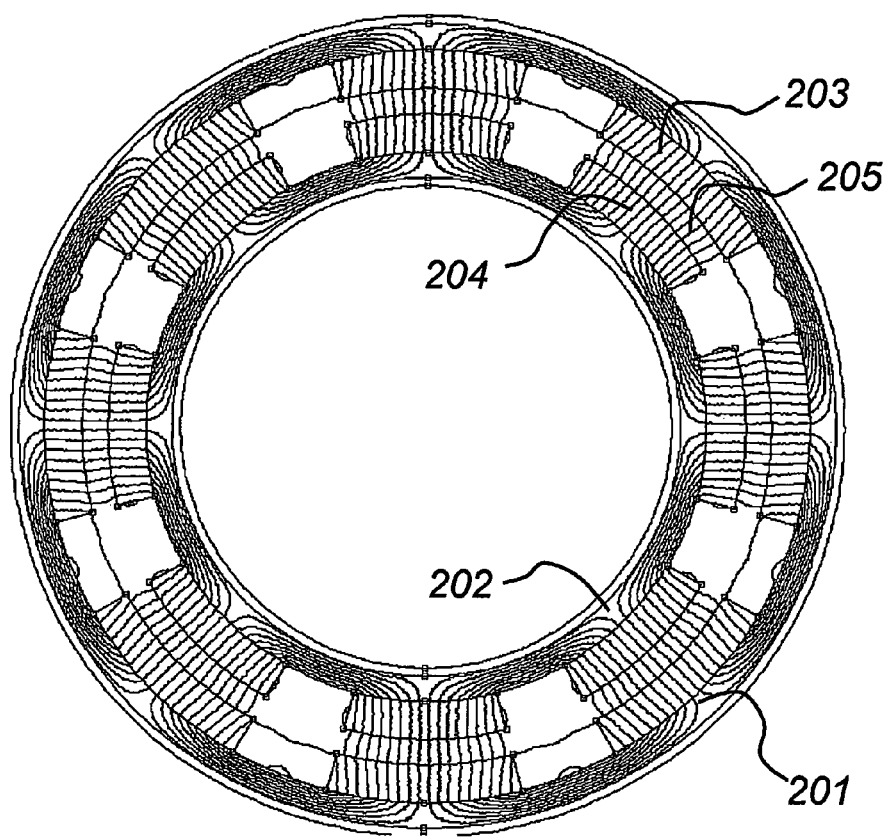
FIG. 2 shows an illustration of a conventional magnetic system of a motor.

For reference reasons the magnetic system of a conventional motor is shown as illustrated in a FEM-output in FIG. 2. Two iron cores 201 and 202 (short circuit iron magnetic holders) are shown being concentrically arranged to one another. On the iron cores, on opposing sides, permanent magnets 203 and 204 are fitted. Between the two opposing magnets there is an air space 205, adapted to accommodate the windings of the motor. Also indicated is the magnetic field in the cores, magnets and the air gap between the magnets. The distribution of the field (a FEM output) is uneven especially in the cores, as may be seen from the drawing. As may also be seen from this figure, there are large regions of the air space 205 which are virtually free from magnetic flux. In such regions, no driving force will be generated by the current flowing in the windings.

The motor according to the invention preferably exhibits a stationary winding and a rotatable magnetic unit. The motor may be arranged with a horizontal axis or a vertical axis.

As the motor according to the invention is intended to rotate the instrument (the movable unit) around at least one axis, the force F should be as close as possible to tangential to a circle of revolution.

As explained above, since as much torque as possible should be produced for the rotation, the current in the winding should ideally be perpendicular to the magnetic flux so that $\sin(\alpha)=\sin(90°)=1$.

In order to accomplish this, the motor according to the invention is so designed as to have a magnetic flux acting as a radial vector with respect to the axis of rotation, and the current as an axial vector parallel to the axis of rotation and perpendicular to the magnetic flux. It should be noted that the magnetic flux changes direction in the radial plane from pole to pole in the motor. The force F is acting at the radius R and transforms into a turning torque. A benefit of choosing a large value on R is thus that it gives a large torque from comparatively small currents and thus low power consumption.

Under the assumption that the force F acts at radius. R to produce the torque $M=F\cdot R$, and that the angle $\alpha$ between the magnetic flux and the current in the winding can be approximated to −90 degrees, the expression above reduces to $M=B*I*L*R$.

As a result of the stationary winding there is no need for brushes or the like as typically employed in prior art motors. Instead, in order to commutate the electric phases in the winding, an angle sensor is used for providing information indicative of the rotational position of the rotor relative to the stator. The angle sensor may be of the type described in the co-pending SE-patent application 0301164-0. The angle sensor is preferably located inside the motor, because this will not only save space but also protect the sensor from dirt and dust. The instrument is designed for outdoor use and should therefore be able to withstand the environmental demands.

The motor is thus of an unconventional design in that the magnetic system of the motor is arranged to be the rotating part (rotor) of the motor and the winding is the stationary part (stator). This has the benefit that the winding may be directly connected electrically to other elements of the instrument and no brushes or the like are needed for driving or powering the motor. Further, the motor is adapted to be used for direct drive of either a horizontal axis or a vertical axis. In a very accurate instrument it is highly preferred that no axial or radial forces are present on the rotating part. It is thus preferred that the winding does not comprise iron, as iron might introduce axial or radial forces between the magnets in the rotating part and the iron.

The motor can be characterised as a synchronous motor having an air gap for accomodating the winding.

Figure 3A:
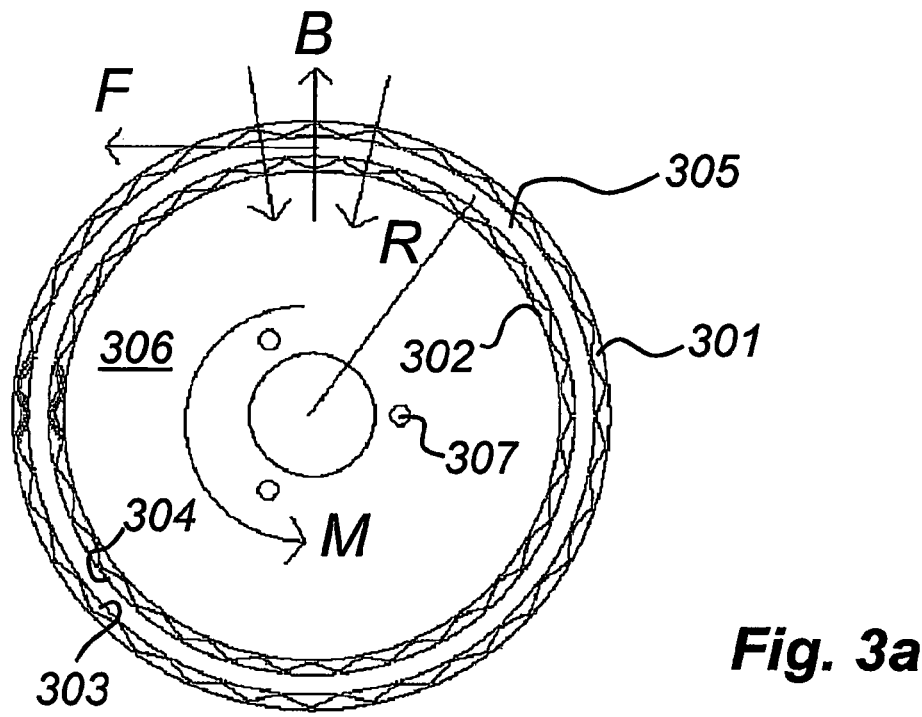
FIGS. 3a and 3b is an example of a magnetic system of a motor according to the invention showing the correlation between current, magnetic field, and force and torque.
Figure 3B:
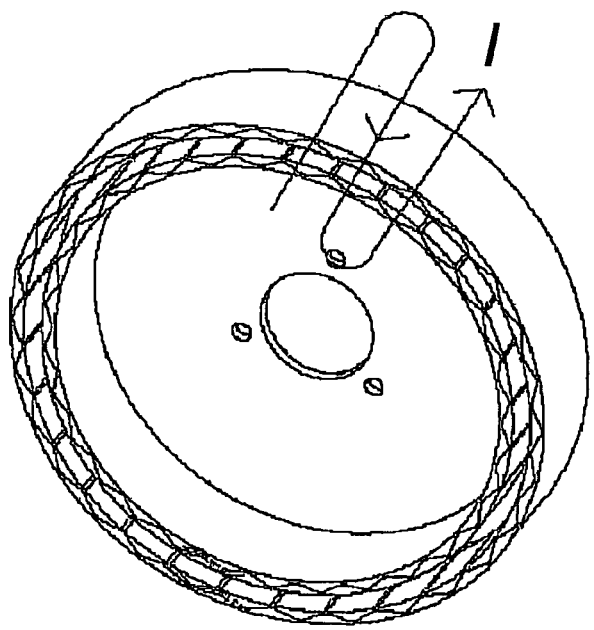

Referring now to FIG. 3, having two schematic drawings 3a and 3b, it illustrates the correlation between current, magnetic field, force, and torque in a motor according to the invention. In the first drawing 3a there is shown the magnetic unit of the motor in a plane view. Two iron cores 301 and 302 are shown being concentrically arranged to one another. In the iron cores, there are fitted permanent magnets 303 and 304. Although not explicitly shown on the drawing by reference numerals, it is to be understood that permanent magnets are provided in the same manner all around the iron cores, as indicated schematically by zig-zag lines in the figure. Between the two cores 301 and 302 there is an air space or gap 305 for accomodating the windings of the motor. The magnetic field from the permanent magnets are indicated by arrows B, the force produced is indicated by the arrow F, acting at the radius R, and the resulting torque is indicated by a curved arrow M. For clarity, the magnetic field B and the force F produced is only shown in one portion in the figure. However, it will be understood that magnetic field is produced at each pair of permanent magnets around the iron cores. In the second drawing 3b there is indicated the current I passing through the winding of the motor. For clarity, the actual winding is omitted from the drawing and only the current is shown. It is clear, however, that this current originates from the winding accomodated in the air gap 305 between the iron cores. From the figure it is understood how the torque originates. During operation of the motor, the electric current in the winding passes the air gap between the iron cores 301 and 302 in alternating directions parallel to the rotational axis as schematically indicated in the figure. The force F producing the torque in the motor is thus created in a continuous and efficient manner as described above. It should be noted that the electric current in the winding is substantially perpendicular to the magnetic field throughout, thus giving the highest possible force for any given level of current.

The iron cores 301 and 301 are arranged on a circular plate 306 having holes 307 for fastening of the movable unit.

Figure 4A:
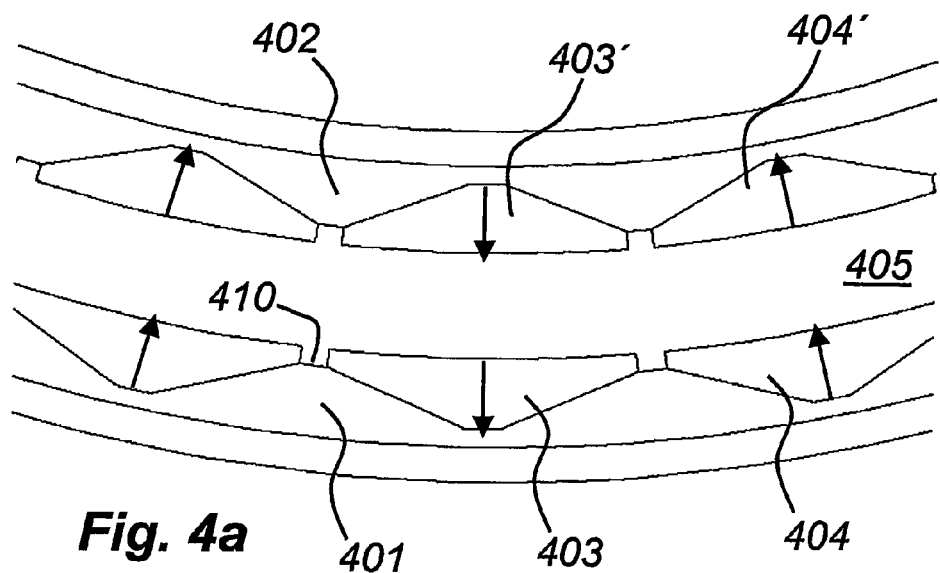
FIG. 4a shows the magnetic system of FIG. 3 in more detail.

The arrangement of the magnets and the iron cores may be further studied in FIG. 4a, which is a schematic drawing in section of the magnetic unit in the magnetic system of FIG. 3. Each pair of permanent magnets, as shown for example at 403, 403' and 404, 404', are turned and oriented such as to have their magnetic direction turned the same way and opposite to the adjacent pair of magnets, such as to produce alternating inwards and outwards magnetic flux. Hence, the magnetic flux produced by the pair of permanent magnets 403, 403' is directed opposite to that produced by the adjacent pair of magnets 404, 404', and so on around the core. The magnetic orientation is indicated by arrows in the figure.

To be noted is the preferred shape of the magnets used according to the invention. The magnets are formed to fit into corresponding recesses in the iron cores. The magnets are elongated bodies being essentially triangular in section but with cut edges, said triangle having a slightly curved base line. Hence, the magnets 403', 404' in the inner core 402 have a slightly convex base line, and the magnets 403, 404 in the outer core 401 have a slightly concave base line.

It may thus be noted that the magnets and the corresponding recesses in the cores make a section having a constant thickness except for the small regions where gaps 410 are formed between two adjacent magnets. The cores 401 and 402 are shown. The concentric air gap 405 between the two cores and magnets is also shown. In this gap the winding has its place.

Figure 4B:
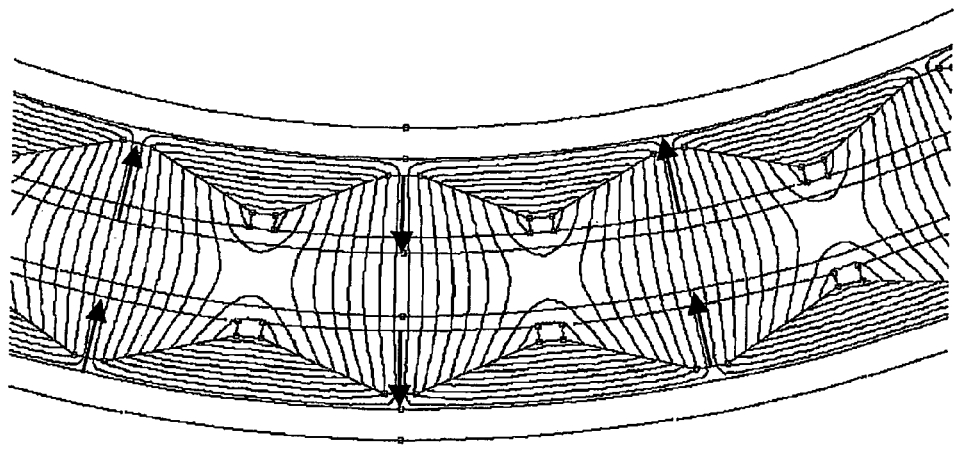
FIG. 4b show a FEM output showing the magnetic field in the magnetic system of FIG. 3.

This construction according to the invention has proved, as is illustrated in a FEM-calculation in FIG. 4b, to give a very evenly distributed magnetic field in the iron core. This gives the advantage, that the iron is utilised very efficiently; there is no iron with very low field which would mainly add weight to the construction, and with a homogeneous field, the amount of iron can be chosen so that it is close to saturation in the whole volume, thus further reducing the weight. Compared to a conventional motor as in FIG. 2, the volume between the poles containing no or a very low field is greatly reduced, again contributing to efficient use of the available volume. It should also be noted that the magnetic field in the air gap between the iron cores is nicely distributed and even.

The preferred materials for the core is soft iron and for the magnets NdFeB- or SmCo-alloys, but also other types of permanent magnets comprising e.g. one or more of the rare earth elements may be used as long as the necessary magnetic field can be achieved.

This magnetic unit according to the invention will thus be the rotatable part of the motor having the rotating axis attached thereto. This allows for the winding part of the motor to be the stationary part thus allowing the winding to be directly connected to the power supply without having to use brushes or slip rings. As will be appreciated, this is a great benefit of the inventive arrangement.

The same design principle as disclosed above for a rotating motor magnetic circuit can also be used for a linear motor. In that case the magnets are arranged in straight or only slightly curved iron cores. It will be readily appreciated by those skilled in the art how the teachings herein can be implemented also in a linear geometry, rather than only in the circular geometry presented above. Instead of utilizing the force F for producing a torque M, which drives a rotational motion, the force F will directly be utilized for movement or propulsion in such linear configuration. In such case, the moving part will then typically be some suitable device containing the winding.

A special winding and a method for preparation thereof has been devised for the invention. The winding according to the invention could also be used with other types of magnetic units of motors as well as the magnetic unit described could also be used with other types of windings. The winding may further be used in an electric generator or the like.

The number of conductors used for the winding is related to the number of phases (n) used in the motor. It has turned out that three phases are preferable, so for the illustrations in FIGS. 6 to 9, the case of a three-phase winding is chosen, the number of conductors being 6=(2*n). Generally, for an n-phase motor the number of conductors for a winding should be equal to 2n for the inventive winding concept, as explained in more detail below.

Figure 5:
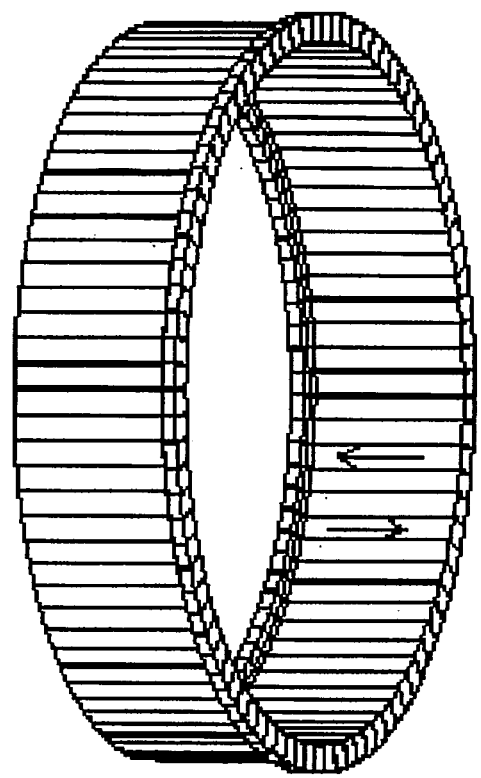
FIG. 5 shows an exemplary winding according to the invention.

In FIG. 5 the final shape of an exemplary winding according to the invention is shown. The direction of electric current in two arbitrarily chosen sections of the winding is shown by arrows. The manner in which this winding is accomplished is shown in the following figures illustrating the text below.

Figure 6:
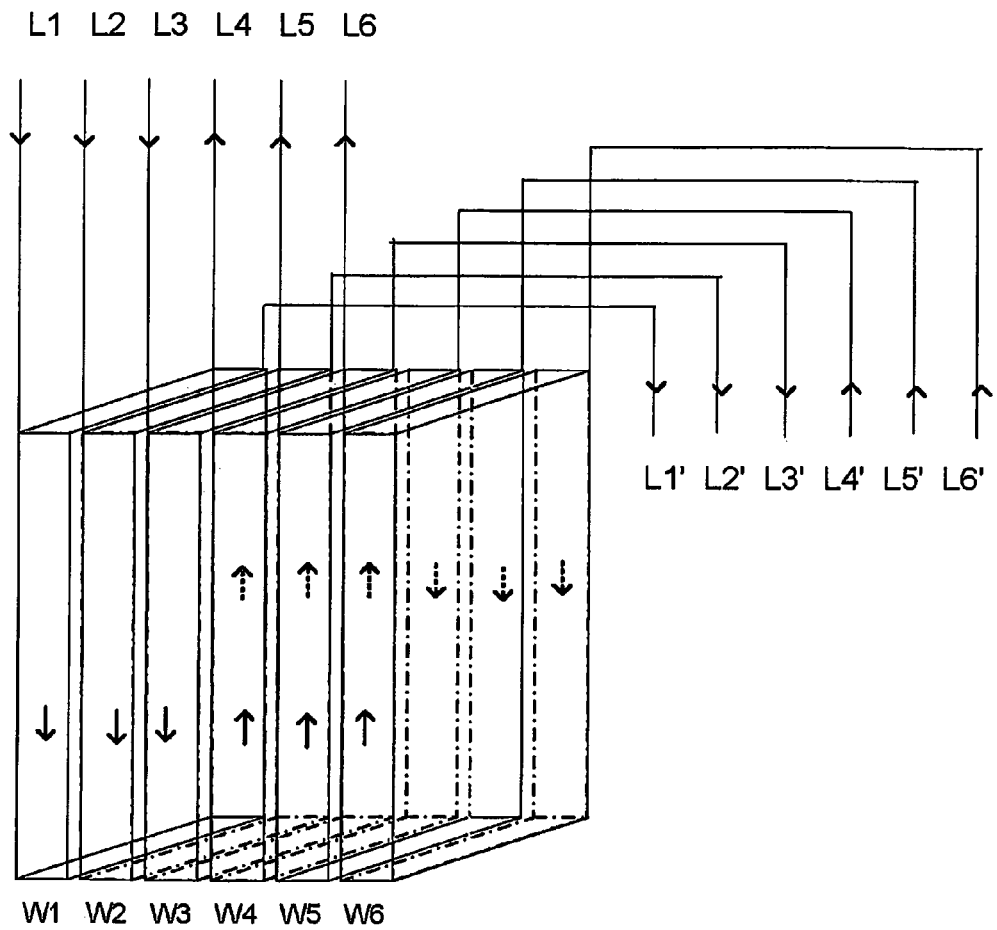
FIG. 6 shows an exemplary manner of making a winding according to the invention.
Figures 7, 8, 9:
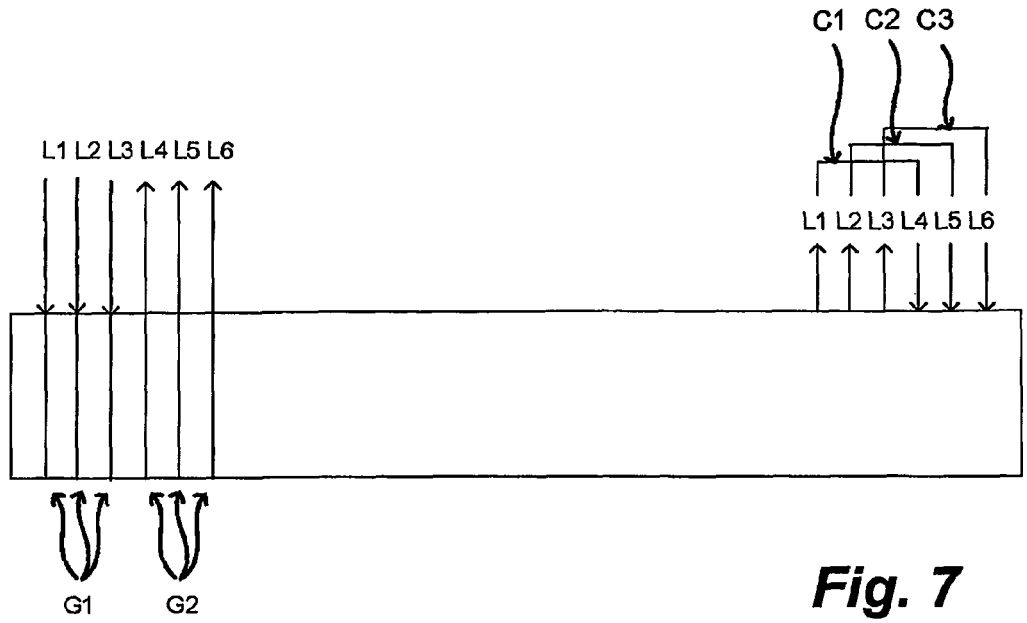
FIG. 7 shows schematically an exemplary manner of connecting the conductors in a winding according to the invention.
FIG. 8 is an illustration of the directions of the currents in the winding according to FIG. 7.
FIG. 9 is an illustration of the directions of the currents in the compressed or flattened winding.

FIG. 6 is a schematic drawing showing the winding principle according to the invention. The winding shown has, as an illustrative example, six electric conductors L1, L2, L3, L4, L5, L6. When manufacturing such winding, all electric conductors are preferably wound simultaneously around e.g. a mandrel (not shown). Each conductor thus forms one individual first winding. More particularly, the first conductor L1 forms a first individual winding W1, comprising a number of turns of the conductor, and the remaining conductors respectively form the other individual windings. The number of conductors, and thereby the number of individual windings, may of course be varied as this is a mere example. As each individual winding W1, W2, W3, W4, W5, W6 is completed, all of the electric conductors are essentially simultaneously shifted axially with respect to the formed individual windings to a position adjacent these windings appropriate for the next set of individual windings. In other words, once a conductor (e.g. conductor L1) has been wound a predetermined number of turns to form a first individual winding (e.g. winding W1), the conductor is moved across the adjacent windings (W2-W6) into position for the forming of an additional winding of the same conductor. The width of each individual winding is chosen so that the total width of the 2n windings corresponds to a pair of poles of the motor (two magnet pairs). The axially shifted conductor ends are shown as L1', L2', L3', L4', L5', L6'. The winding and shifting is then repeated to form a total number of individual windings equal to n times the number of poles in the motor. It should be noted that each individual winding may comprise one or several layers of wire. When winding the wire, it is typically moved back and forth for producing a plurality of layers. Hence, for an individual winding having an odd number of layers, the individual winding will be completed when the wire is located at one end of this individual winding, while for an individual winding having an even number of layers, it will be completed when the wire is located at the other end of this individual winding. Therefore, the amount of axial displacement or shifting of the wires will depend upon whether the individual winding is completed at one or the other end thereof. Typically, the amount of axial shifting will thus be 2n or 2n−1 times the width of an individual winding. FIG. 7 illustrates how the conductors, in a subsequent step, are connected by interconnecting the conductors L1 and L4 at a connection C1, L2 and L5 at C2, and L3 and L6 at C3, at the end or ends of the overall winding, thereby achieving a winding having winding groups G1, G2, wherein at any point in time an individual winding of the first group exhibits one direction of current flow and wherein at the same point in time a corresponding individual winding of the adjacent group exhibits the opposite direction of current flow. In other words, due to the connections C1, C2, C3, corresponding individual windings (connected to the same phase) of adjacent groups will be in anti-phase. This gives as a result that when the finished overall winding is removed from the mandrel, flattened or compressed, and formed into a cylindrical winding by letting the two outer ends of the winding meet each other, the number of winding groups will be such as to provide that interconnected individual windings of any two adjacent winding groups exhibit opposite current directions around the cylinder. In the drawing there is indicated the current direction in the six conductors at the first end of the winding resulting from the interconnection C1, C2, C3 at the second end of the winding for a case where wires L1, L2, L3 have a common direction of current flow. It should be noted, however, that these currents will generally be out of phase (e.g. by 120 degrees).

However, it is noted that if the winding is flattened without taking any further measures, the front and the back portion of each individual winding will exhibit opposing current directions, which would not give the right effect but rather cancel out the desired force.

FIG. 8 schematically illustrates a portion of the winding structure before being flattened, while FIG. 9 schematically illustrates a portion of the winding structure after having been flattened.

In FIG. 8 the cross-section of the winding, perpendicular to the view shown in FIG. 7, is shown and the current direction is schematically indicated by circles ("up") and crosses ("down"). In the figure w1a and w1b respectively denote the front and back part of winding W1 and so on.

According to the invention, when the winding is flattened the front part of each individual winding is displaced sideways with respect to the back part of the same individual winding. The result is schematically illustrated in FIG. 9. The back parts w1b, w2b and w3b of the windings W1, W2 and W3 are now placed opposite the front parts w4a, w5a and w6a of windings W4, W5 and W6, respectively, which means that the current direction of the opposing back and front parts will coincide (as seen from the current directions which are indicated by an arrow on the conductors in FIG. 6, and also on the front- and backparts respectively of the windings W1-W6 in FIGS. 8 and 9). In this context, it should be understood that each individual winding comprises a number of conductor loops, such that current on one side (the frontside) of the winding flows in one direction (e.g. "down") while the current on the opposite side (the backside) flows in the opposite direction (e.g. "up"). By flattening or compressing the entire winding structure in such a manner that the backside of the winding formed by conductor L1 in winding W1 meets with the frontside of the winding formed by conductor L4 in winding W4, the direction of the electric current in the overlapping region will be the same in conductors L1 and L4, as evident from FIG. 9. For example, the backside w1b of the first winding W1 will overlap with the frontside w4a of the fourth winding W4, with the effect that the current will flow in the same direction at w1b and w4a and thus add to the torque produced by the inventive motor.

Further, after flattening the winding it is rolled into a cylinder, so that the outer end parts overlap, i.e. the last three winding halves will overlap the winding parts w1a to w3a. Finally the structure will be heat treated, so that the self-bonding wires will adhere to each other, resulting in a rigid cylinder containing the wires. In this manner, a winding for the rotating part of the motor can be accomplished without any need for heavy iron parts or the like in the winding. After the heat treatment, the winding forms a self-supported structure of lowest possible weight.

It should be pointed out that the winding when flattened can be used in a linear motor using the same design principle, as has been explained above.

It is particularly preferred to employ the inventive motor concept in a geodetic instrument such as a total station. In a total station, most or all of the control circuitry and other elements are typically provided in a movable part thereof (supported by a rotary alidade). In particular, a battery pack providing power for the instrument is typically located in this movable part. When using the inventive motor concept in a total station, the winding part of the motor is therefore preferably stationary with respect to said moving part of the instrument. The electrical connection of the winding to the power source may thus be made without any brushes or slip rings.

Figure 10:
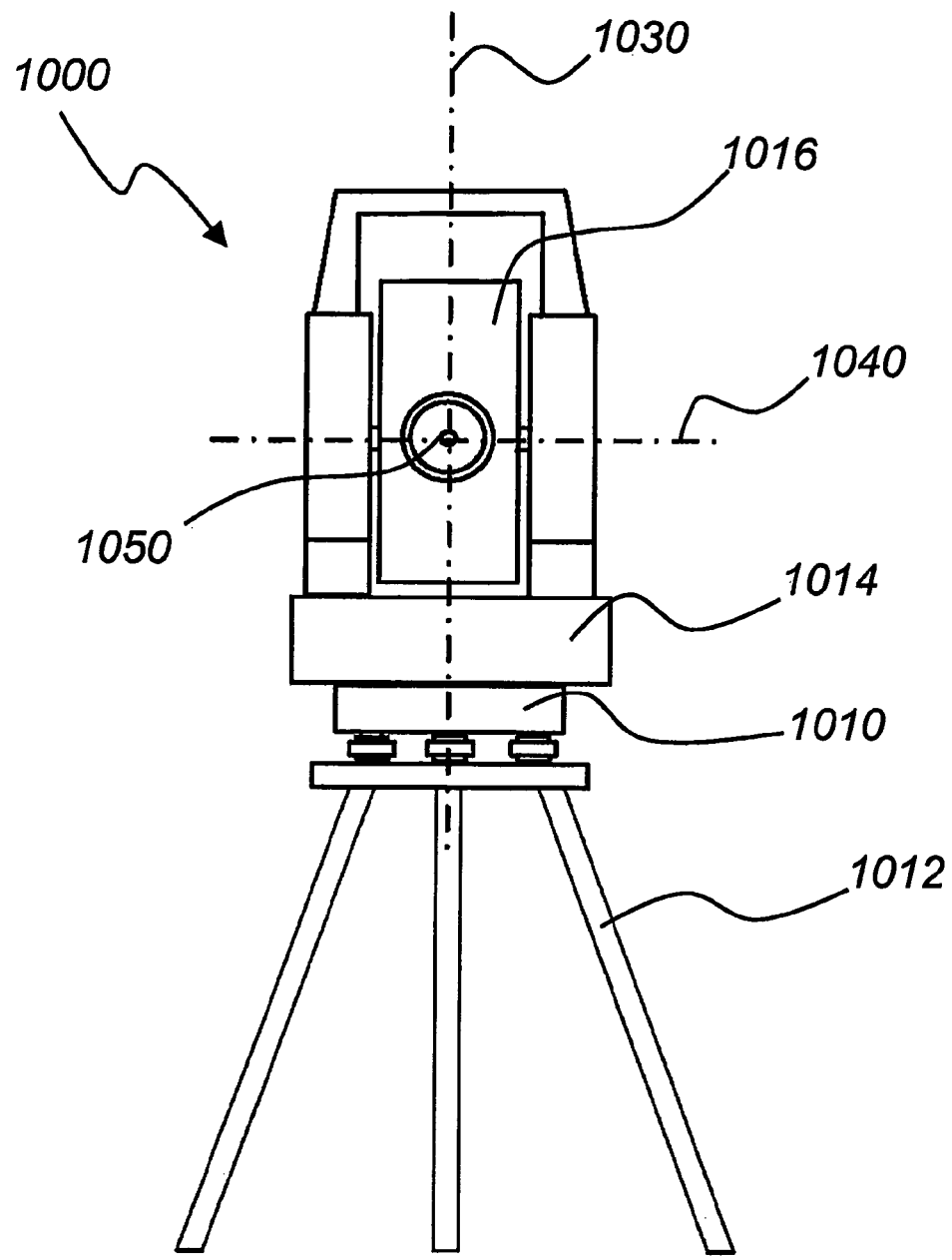
FIG. 10 is a drawing schematically showing a total station in which the inventive motor concept is advantageously employed.

FIG. 10 schematically shows a total station 1000 in which the inventive motor concept is advantageously utilized. As for most total stations, it includes a base 1010 mounted on a tripod 1012, an alidade 1014 mounted on the base for rotation about an azimuthal axis 1030 and a telescope 1016 mounted on the alidade for rotation about an elevation axis 1040. The telescope has a sighting axis 1050, which is aimed at a point of measurement during use of the total station. During use, it is often desired to rapidly adjust the sighting axis to a new point of measurement by rotating the instrument about the azimuthal axis 1030 and the elevation axis 1040. To this end, it is particularly preferred to utilize the inventive motor concept. For rotation about the azimuthal axis, a motor according to the inventive concept disclosed herein is preferably mounted with the winding thereof stationary with respect to the alidade 1014. Power may then be fed to the motor from a battery pack or the like provided in the alidade, without any need for brushes or slip rings. Another motor may be similarly provided for rotation about the elevation axis 1040. In case the same power source, provided in the alidade, is used also for driving elevational rotation, the motor for elevational rotation will typically be arranged with the winding thereof stationary with respect to the alidade.

It should particularly be appreciated that driving of azimuthal and elevational rotation may be effected without the need for any gear arrangements when the inventive motor concept in employed in a total station. The omission of gear arrangements is possible by virtue of the high torque produced by the motor. As a consequence, mechanical noise is reduced, backlash is essentially eliminated and repositioning to a new point of measurement may be effected rapidly.

It is, of course, not necessary to have the inventive motor mounted with the winding thereof stationary with respect to the alidade. It is also possible to have the winding of the motor stationary with respect to the base, particularly if the power source is provided in the base.

Further advantages are also achieved by the use of the inventive electric motor in a total station. Since no gear arrangement is required for rotation of the total station or any part thereof, the problems noted in the introduction above related to backlash and hysteresis, lubrication requirements, noise and servo loop complexity may thus be obviated. In addition, due to the superior torque and controllability of the inventive motor, azimuthal and elevational adjustments of the total station can be made at faster rates.

It will be apparent that within the scope of the invention various other changes than the ones mentioned above can be made to the disclosed embodiments.

Still other modifications will occur to those of ordinary skill in the art. All such modifications and variations are within the scope of the invention. The embodiments chosen and described here have the purpose of explaining the principles of the invention and its practical application, thereby enabling those skilled in the art to utilize the invention in various embodiments and with various modifications as suitable for the particular use contemplated. It is therefore the intention that the following claims not be given a restrictive interpretation but should be viewed to encompass variations and modifications that are derived from the subject matter disclosed.

The invention claimed is:

1. A method of preparing a winding for an n-phase electric motor, said method comprising:
    (a) continuously and simultaneously winding a 2n-plurality of insulated conductors in a same direction around a mandrel to obtain at least a 2n-plurality of individual windings;
    (b) axially shifting the conductors with respect to the formed individual windings to a position adjacent the individual windings obtained in step (a);
    (c) repeating steps (a) and (b) a predetermined number of times, the repeating of the steps (a) and (b) being accomplished by winding the 2n-plurality of insulated conductors around the mandrel in the same direction as step (a);
    (d) interconnecting pairs L(y) and L(y+n) of said conductors at an end of the overall winding, where y is an integer varying from 1 to n, such that conductors L(y) and L(y+n) are configured to conduct current in opposite directions
    (e) flattening the winding by collapsing first and second parts of each individual winding upon itself such that the parts of the winding are adapted to conduct current in the same direction are placed adjacent to each other.

2. The method according to claim 1, wherein during flattening of the winding, interconnected pairs of conductors are placed adjacent each other.

3. The method according to claim 2, further comprising:
    forming the flattened winding into a cylinder shape, wherein n first parts at one end of the winding are placed adjacent n second parts at the other end of the winding.

4. The method according to claim 1, further comprising:
    forming the flattened winding into a cylinder shape, wherein n first parts at one end of the winding are placed adjacent n second parts at the other end of the winding.

5. The method according to claim 4, wherein,
    the forming of the flattened winding into the cylinder shape includes ensuring that the interconnected pairs of conductors are located directly adjacent to each other,
    each interconnected pair forming a portion of a side wall of the cylinder shape and having a length running parallel to a centerline of the cylinder shape, the centerline penetrating the center of the cylinder shape and being parallel to the sidewalls of the cylinder shape.

6. The method according to claim 1, wherein the winding is made using self-bonding conductors, the method further comprising heat-treating the formed winding in order to obtain a self-supported winding structure.

7. A geodetic instrument comprising an n-phase electric motor for rotating a moving part of the instrument, said n-phase electric motor including a winding prepared according to the method of claim 1.

8. A winding for an n-phase electric motor, said winding comprising:
    a continuously wound 2n-plurality of insulated conductors, said winding having at least a first 2n-plurality of individual windings wound in the same direction; and
    at least one further 2n-plurality of individual windings adjacent said first 2n-plurality of individual windings, said at least one further 2n-plurality of individual windings being wound in the same direction as said first 2n-plurality of individual windings,
    wherein pairs L(y) and L(y+n) of said conductors are interconnected at an end of the overall winding, where y is an integer varying from 1 to n, to form n winding pairs, each pair being adapted for connection to one phase of the motor, wherein individual wires of said pairs of said wires are configured to conduct current in opposite directions,
    the winding further being flattened such that a first and a second part of each individual winding are displaced sideways in order for parts of each winding in a winding pair conducting current in the same direction to be located immediately adjacent to each other.

9. The winding according to claim 8, wherein the conductors are fixated to each other to provide a self-supporting winding.

10. The winding according to claim 8, wherein the overall winding has at least one of a circular and a cylindrical form adapted for a rotary electric motor.

11. The winding according to claim 8, wherein the electric conductors are fixated to each other to provide a self-supporting winding.

12. A geodetic instrument comprising an n-phase electric motor for rotating a moving part of the instrument, wherein said electric motor comprises a winding according to claim 8.

13. The winding according to claim 8, wherein the interconnected pairs of conductors are placed immediately adjacent to each other.

14. The winding according to claim 8, wherein,
    the winding is in a cylinder shape,
    the interconnected pairs of conductors are located directly, adjacent to each other,
    each interconnected pair forms a portion of a side wall of the cylinder shape and has a length running parallel to a centerline of the cylinder shape, the centerline penetrating the center of the cylinder shape and being parallel to the sidewalls of the cylinder shape.

15. A method for producing a geodetic instrument comprising an n-phase electric motor for rotating a moving part of the instrument, wherein said electric motor comprises a winding, said method comprising:
    (a) continuously and simultaneously winding a 2n-plurality of insulated conductors (L1-L6) in a same direction around a mandrel to obtain at least a 2n-plurality of individual windings (W1-W6);
    (b) axially shifting the conductors with respect to the formed individual windings to a position adjacent the individual windings obtained in step (a);
    (c) repeating steps (a) and (b) a predetermined number of times, the repeating of the steps (a) and (b) being accomplished by winding the 2n-plurality of insulated conductors around the mandrel in the same direction as step (a);
    (d) interconnecting pairs L(y) and L(y+n) of said conductors at an end of the overall winding, where y is an integer varying from 1 to n, such that conductors L(y) and L(y+n) are configured to conduct current in opposite directions; and
    (e) flattening the winding by displacing first and second parts of each individual winding such that parts adapted to conduct current in the same direction are placed adjacent to each other.

* * * * *